(12) United States Patent
Larumbe et al.

(10) Patent No.: US 10,476,688 B1
(45) Date of Patent: *Nov. 12, 2019

(54) URL REPLICATION FOR LIVE BROADCAST STREAMING

(71) Applicant: Facebook, Inc., Menlo Park, CA (US)

(72) Inventors: Federico Daniel Larumbe, Mountain View, CA (US); Huapeng Zhou, Union City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,454

(22) Filed: Oct. 17, 2018

Related U.S. Application Data (63) Continuation of application No. 15/098,170, filed on Apr. 13, 2016, now Pat. No. 10,122,539.

(51) Int. Cl.
  *G06F 15/167* (2006.01)
  *H04L 12/18* (2006.01)
  *H04L 29/06* (2006.01)

(52) U.S. Cl.
  CPC .......... *H04L 12/18* (2013.01); *H04L 65/1063* (2013.01); *H04L 65/4076* (2013.01)

(58) Field of Classification Search
  CPC .. H04L 12/18; H04L 65/1063; H04L 65/4076
  See application file for complete search history.

(56) References Cited

U.S. PATENT DOCUMENTS

| 6,035,324 A | 3/2000 | Chang et al. |
|---|---|---|
| 2003/0065739 A1 | 4/2003 | Shnier |
| 2007/0233706 A1 | 10/2007 | Farber et al. |
| 2010/0268789 A1 | 10/2010 | Yoo et al. |
| 2011/0083037 A1 | 4/2011 | Bocharov et al. |
| 2011/0125846 A1 | 5/2011 | Ham et al. |
| 2013/0204961 A1 | 8/2013 | Fliam et al. |
| 2015/0006621 A1 | 1/2015 | Westphal |
| 2015/0188994 A1 | 7/2015 | Marshall et al. |
| 2015/0296274 A1 | 10/2015 | Good et al. |
| 2016/0127440 A1 | 5/2016 | Gordon |
| 2016/0232538 A1 | 8/2016 | Papakostas et al. |
| 2017/0238040 A1 | 8/2017 | Kluysegems et al. |

FOREIGN PATENT DOCUMENTS

WO   2012/149556 A2   11/2012

OTHER PUBLICATIONS

U.S. Appl. No. 15/098,207, "Cache System for Live Broadcast Streaming" of Larumbe, F., filed Apr. 13, 2016, 47 pages.

(Continued)

*Primary Examiner* — Ryan J Jakovac
(74) *Attorney, Agent, or Firm* — FisherBroyles, LLP (57) ABSTRACT

Several embodiments include a live stream system in a media distribution network. The live stream system can divide a broadcast stream from a broadcaster device into one or more media segments. The live stream system can generate an original manifest uniform resource locator (URL) and a duplicate manifest URL to associate with the media segments. The live stream system can generate a broadcast manifest that identifies the media segments via one or more segment identifiers. The live stream system can upload the broadcast manifest and the media segments to a cache system to make the broadcast manifest accessible via either the original manifest URL or the duplicate manifest URL.

20 Claims, 7 Drawing Sheets

(56) References Cited

OTHER PUBLICATIONS

Non-Final Office Action received for U.S. Appl. No. 15/098,170 dated Apr. 6, 2018, 35 pages.
Notice of Allowance received for U.S. Appl. No. 15/098,170 dated Jul. 17, 2018, 14 pages.
Non-Final Office Action received for U.S. Appl. No. 15/098,207 dated Jul. 18, 2018, 33 pages.
Final Office Action received for U.S. Appl. No. 15/098,207 dated Dec. 21, 2018, 114 pages.

URL REPLICATION FOR LIVE BROADCAST STREAMING

CROSS-REFERENCE TO RELATED APPLICATION(S)

This application relates to U.S. patent application Ser. No. 15/098,207, entitled "CACHE SYSTEM FOR LIVE BROADCAST STREAMING," filed on Apr. 13, 2016, and is a continuation of U.S. application Ser. No. 15/098,170 entitled "URL REPLICATION FOR LIVE BROADCAST STREAMING" filed on Apr. 13, 2016, both of which are incorporated by reference herein in their entirety.

BACKGROUND

A wide area network (WAN) can connect a local area network (LAN) established by an Internet service provider (ISP) to a data center outside of the LAN. A WAN may employ edge point of presence (PoP) cache systems and content delivery networks (CDNs) to reduce the likelihood of network traffic causing bottlenecks at the data centers. Cache systems can store popular content, e.g., a video or photo that is requested by users in locations that are closer to the users than the data centers, in terms of geographic distance, network distance ("hops"), or both. A "cache hit" occurs when requested data can be found in a cache, whereas a "cache miss" occurs when it cannot. Having a high cache "hit rate" lowers the latency of delivering the content to the user and also reduces the bandwidth requirement because the requested data has to travel a smaller distance than from the data center.

The need for a high cache hit rate suggests the need for a reduced number of cache systems such that each cache system can serve a higher number of requesters. Popular content can be repeatedly served to clients without fetching data from an origin data center. However, in certain applications, such as live broadcasting, a cache system often receives client requests simultaneously or within a short time interval as to be substantially simultaneous. The substantially simultaneous arrival of a large batch of client requests (e.g., greater than two hundred thousand or a million client requests) can increase the likelihood of overloading the cache system. The balance between optimizing for higher hit rate and reducing the potential threat of overloading the cache system remains a challenge in the industry.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Embodiments are disclosed for a caching system to service end-user devices across a wide area network on behalf of one or more data centers (e.g., data centers of a social networking system or a data center storing media files, such as video, audio, or images). Various embodiments involve preventing cache systems (e.g., an edge PoP cache system and/or an origin cache system) from crashing when millions of data requests begin to overwhelm the cache systems. For example, the disclosed system can alleviate the potential crashes associated with live video broadcasting.

In some embodiments, a cache system can implement a request processing tier (e.g., implemented by physical or virtual proxy servers) and a storage tier (e.g., implemented by physical or virtual cache servers). The proxy servers can serve as a request gateway to process a subset of all incoming client requests to the cache system. The cache servers can serve as a storage access interface. The proxy servers can also serve the function of load balancing the cache servers. In some embodiments, for each client request of a client device, the client device can establish a communication link with a proxy server. The client request can specify a uniform resource locator (URL) corresponding to a content object (e.g., a static file object or a data stream, such as a video stream or an audio stream). To fulfill a client request, the proxy server can determine which of the cache servers to contact to fulfill the client request.

In some embodiments, to alleviate the burst of requests associated with a live streaming broadcast, a proxy server can coalesce client requests that pertain to the same URL (e.g., requested content object). The proxy server can delay the responses to the coalesced client requests based on an exponential backoff algorithm. The delay enables the proxy server to contact the one or more cache servers (e.g., of the storage tier) associated with the client requests only once or a smaller number of times compared to the total number of client requests for the same URL.

Similarly in some embodiments, a cache server can also coalesce the cache lookup requests into a group that pertains to the same requested object. The cache server can delay the responses to the coalesced cache lookup requests based on an exponential backoff algorithm. The delay enables the cache server to fetch an un-cached content object only once per coalesced group, and reduces the cache misses associated with a burst of cache lookup requests.

In some embodiments, a cache system can interface with a live stream server system (e.g., one or more live stream servers). The live stream server system can generate a broadcast manifest and one or more media segments associated with an incoming broadcast stream. The live stream server system can also generate a URL to associate with the broadcast stream. In at least one example, a social network can distribute the URL to various end-user devices. One or more client requests to the cache system can be generated based on user interactions with the URL. In some embodiments, the live stream server system can duplicate the URL to alleviate the load on individual cache servers. For example, which cache server is selected to service which cache lookup request may be based a hash of the requested URL. Having duplicate URLs can enable the cache system to naturally load balance its cache servers.

Figure 1:
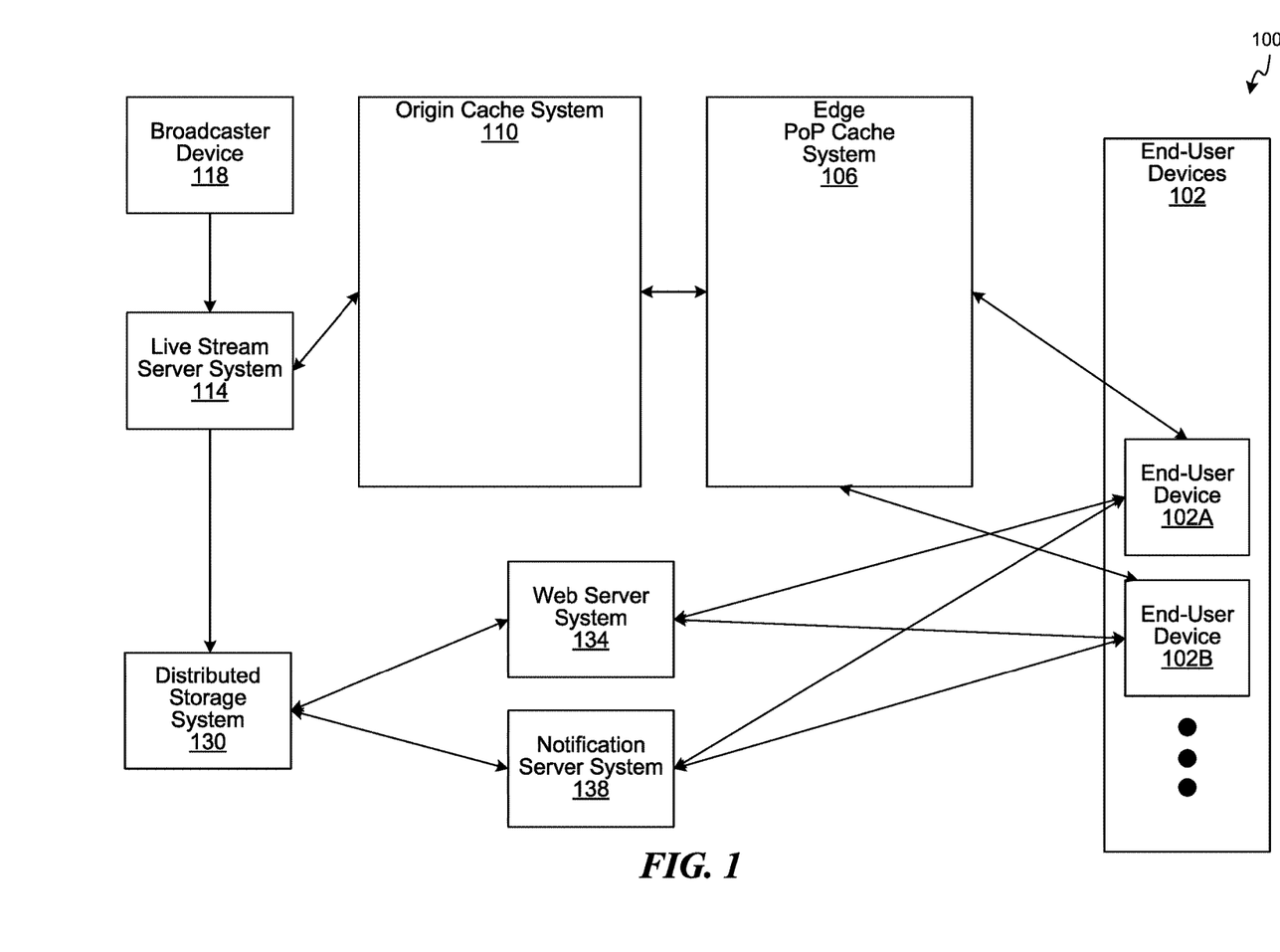
FIG. 1 is a block diagram illustrating a network environment of a media distribution system, in accordance with various embodiments.

Turning now to the figures, FIG. 1 is a block diagram illustrating a network environment of a media distribution system 100, in accordance with various embodiments. The media distribution system 100 can interface with one or more end-user devices 102 (e.g., an end-user device 102A, an end-user device 102B, etc., collectively as the "end-user devices 102"). For example, the media distribution system 100 can stream one or more live broadcasts (e.g., live video) to the end-user devices 102. The media distribution system 100 can include an edge PoP cache system 106, an origin cache system 110, and a live stream server system 114. The origin cache system 110 can store content objects made accessible by the media distribution system 100 and serve these content objects to downstream distribution systems (e.g., one or more edge PoP cache systems, including the edge PoP cache system 106). The edge PoP cache system 106 can store content objects retrieved from the origin cache system 110 and serve these content objects to the end-user devices 102. In some embodiments, the edge PoP cache system 106 is setup closer to groups of end-user devices, for example, based on geographical locations (e.g., countries).

A broadcaster device 118 can stream a live broadcast video to the live stream server system 114. For example, the broadcaster device 118 can stream the live broadcast video via the real-time messaging protocol (RTMP), Hypertext Transfer Protocol (HTTP) Live Streaming (HLS) protocol, transmission control protocol (TCP) based application protocol, or other video or audio streaming protocols. The broadcaster device 118 can be a mobile device (e.g., a smart phone, a tablet, a laptop, a wearable device, etc.) or a stationary device (e.g., a desktop computer, a computer server, etc.).

The live stream server system 114 can generate a broadcast manifest and one or more broadcast segments (e.g., separated video and audio segments or combined audio and video (A/V) segments) based on the live broadcast stream received from the broadcaster device 118. For example, the live stream server system 114 can divide live broadcast video into files representative of sequential video segments. The live stream server system 114 can define a URL (e.g., referred to as a "link") to associate with the broadcast manifest of the live broadcast video. The live stream server system 114 can define URLs (e.g., relative to the URL of the broadcast manifest) for the video segments. The URLs of the video segments can be the manifest URL with a sequential number or symbol added as a prefix or suffix. In some embodiments, the live stream server system 114 can duplicate the manifest URL according to the method 600 of FIG. 6.

A distributed storage system 130 (e.g., of a social networking system) can store metadata associated with the live broadcast in a social graph. For example, the distributed storage system 130 can store the manifest URL. A web server system 134 (e.g., of the social networking system) can provide the manifest URL to the end-user devices 102. For example, when the end-user device 102A accesses its newsfeed page (e.g., containing live stories) in the social network system via the web server system 134, the web server system 134 can dynamically generate the newsfeed page with the manifest URL. The manifest URL in turn enables the end-user device 102A to view/stream the live broadcast video. A notification server system 138 (e.g., of the social networking system) can provide the manifest URL to the end-user devices 102 as interrupt messages (e.g., push messages). A push message is a style of Internet-based communication where the message is initiated by the publisher of the message without a receiver first requesting it.

For example, the end-user device 102A can generate a content request (e.g., referred to as a "client request") that specifies a manifest URL. The end-user device 102A can also generate a content request that specifies at least one of the video segment URLs after the end-user device 102A extracts the relative URLs of the video segments from the broadcast manifest it previously received. When the content request from the end-user device 102A arrives at the edge PoP cache system 106, the edge PoP cache system 106 can look up the requested content object in its data cache (e.g., by generating a cache lookup request) to determine whether there is a cached copy. The edge PoP cache system 106 can coalesce the client requests and defer processing of at least a subset of the coalesced client requests (e.g., by generating corresponding cache lookup requests to its storage tier) according to the method 500 of FIG. 5. When there is a cache miss at the edge PoP cache system 106 (e.g., meaning that the cache does not presently store the requested content object at the time of the cache lookup request), the edge PoP cache system 106 can check with the origin cache system 110 (e.g., by sending a data fetch request) to determine whether there is a cached copy of the requested content object (e.g., the broadcast manifest or one or more video segments). The edge PoP cache system 106 can coalesce the cache lookup requests in its storage tier and defer processing of at least a subset of the coalesced cache lookup requests according to the method 500.

The origin cache system 110 can receive one or more data fetch requests from one or more edge PoP cache systems. The origin cache system 110 can coalesce the data fetch requests and defer processing of at least a subset of the coalesced data fetch requests (e.g., by generating corresponding cache lookup requests to its storage tier) according to the method 500. In response to a data fetch request, if the origin cache system 110 has a copy of the requested content object, then the origin cache system 110 can fulfill the data fetch request by delivering the requested content object to the end-user device 102A without fetching the requested content object from the live stream server system 114. If the origin cache system 110 does not have a copy, then the data fetch request is propagated to the live stream server system 114 to fetch the requested content object. The origin cache system 110 can then cache the requested content object from the live stream server system 114. In turn, the origin cache system 110 can respond to the data fetch request of the edge PoP cache system 106 by returning the requested content object from the live stream server system 114. In some embodiments, the edge PoP cache system 106 coalesces the cache lookup requests in its storage tier and defer processing of at least a subset of the coalesced cache lookup requests according to the method 500.

In some embodiments, other caching network systems, appliances, or components can be used in the media distribution system 100 (e.g., between the edge PoP cache system 106 and the origin cache system 110, or between the origin cache system 110 and the live stream server system 114). In these embodiments, the other cache appliances/systems/components can provide the same functionalities as the edge PoP cache system 106 and/or the origin cache system 110.

Figure 2:
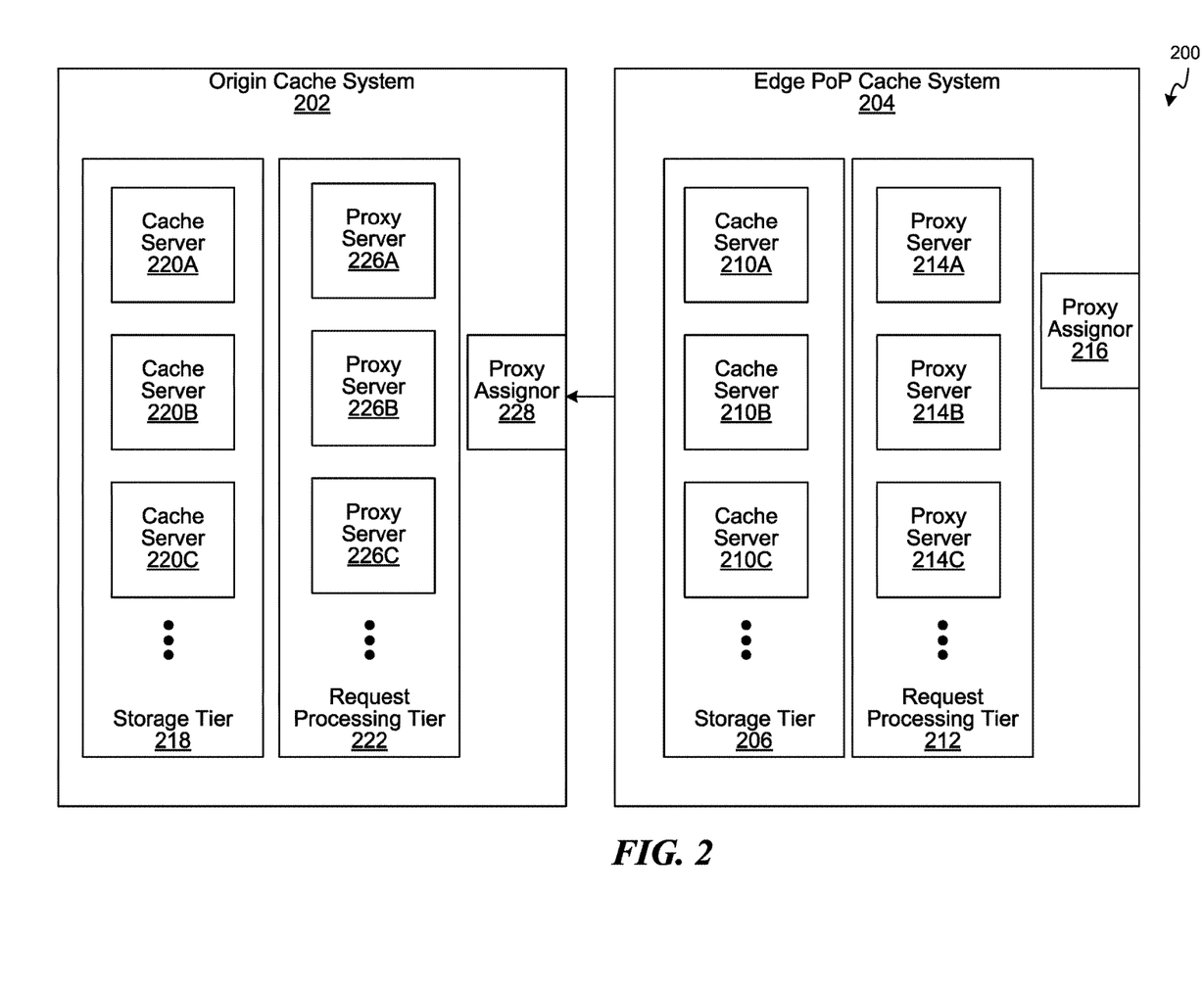
FIG. 2 is a block diagram illustrating run-time components of cache systems in a media distribution system, in accordance with various embodiments.

FIG. 2 is a block diagram illustrating run-time components of cache systems in a media distribution system 200 (e.g., the media distribution system 100), in accordance with various embodiments. The media distribution system 200 can include multiple cache systems. In the illustrated example, the media distribution system 200 includes an origin cache system 202 (e.g., the origin cache system 110) and an edge PoP cache system 204 (e.g., the edge PoP cache system 106). The edge PoP cache system 204 can include a storage tier 206 of one or more cache servers 210 (e.g., a cache server 210A, a cache server 210B, a cache server 210C, collectively as the "cache servers 210"), a request processing tier 212 of one or more proxy servers (e.g., a proxy server 214A, a proxy server 214B, and a proxy server 214C, collectively as the "proxy servers 214"), and a proxy assignor 216. The origin cache system 202 can include a storage tier 218 of one or more cache servers (e.g., a cache server 220A, a cache server 220B, a cache server 220C, collectively as the "cache servers 220"), a request processing tier 222 of one or more proxy servers (e.g., a proxy server 226A, a proxy server 226B, and a proxy server 226C, collectively as the "proxy servers 226"), and a proxy assignor 228. The proxy servers 214 and 226 and/or the cache servers 210 and 220 can be implemented in physical computer servers (e.g., the computing device 700), virtual servers, or any combination thereof. For example, each physical computer server can implement one or more virtual servers.

When an end-user device (e.g., one of the end-user devices 102) sends a request for content at a URL (e.g., a manifest URL or a video segment URL) via its Internet service provider (ISP), a domain name system (DNS) can provide an Internet protocol (IP) address to the end-user device. The IP address can be associated with the closet PoP (e.g., the edge PoP cache system 204) to the end-user device that serves a content object associated with the requested URL.

The edge PoP cache system 204 can include the proxy assignor 216. The proxy assignor 216 is a run-time logic component that acts as a load balancer for incoming client requests. In some embodiments, the proxy assignor 216 is hosted on its own computer server (e.g., a computer server that does not host other run-time logic components of the edge PoP cache system 204). The edge PoP cache system 204 can include one or more proxy servers. The proxy servers 214 can also be run-time logic components. Each of the proxy servers 214 can be implemented in a native operating system of a computer server or a virtual machine.

The proxy assignor 216 can assign (e.g., randomly assigned) a client request to one of the proxy servers 214. Each of the proxy servers 214 processes incoming client requests. For example, the client requests can be formatted according to HTTP or other TCP-based protocol.

A requesting device (e.g., one of the end-user devices 102) can establish a HTTP or HTTP secure (HTTPS) connection with the assigned proxy server. A client request from the requesting device can specify a URL corresponding to the requested content object (e.g., a media file or a live stream). The assigned proxy server can determine whether the requested content object is available in the assigned proxy server (e.g., in a local cache of the proxy server and not part of the storage tier 206). If the assigned proxy server has the requested content object, the assigned proxy server can directly return the content object to the requesting device. If the assigned proxy server does not have the requested content object, the assigned proxy server can generate a cache lookup request to send to a cache server in the storage tier 206.

The edge PoP cache system 204 can implement the storage tier 206 via the cache servers 210. The assigned proxy server can select a cache server to send the cache lookup request. In some embodiments, the assigned proxy server can select a cache server based on the URL. For example, the assigned proxy server can process the URL through a hash function to compute a hash value and utilize the hash value as a key for determining which cache server to send the cache lookup request. The selected cache server can determine whether there is a cache hit or a cache miss in its own data storage cache. If there is a cache hit, the selected cache server returns the requested content object to the assigned proxy server, and the assigned proxy server returns the requested content object to the requesting device. In some embodiments, if there is a cache miss, the selected cache server notifies the assigned proxy server of the cache miss, and the assigned proxy server contacts the origin cache system 202 to fetch the requested content object. In some embodiments, if there is a cache miss, the selected cache server directly sends a data fetch request to the origin cache system 202.

In some embodiments, after the edge PoP cache system 204 sends a data fetch request to the origin cache system 202, the proxy assignor 228 of the origin cache system 202 assigns the data fetch request to a proxy server (e.g., one of the proxy servers 236). The proxy assignor 228 is a logic component that acts as a load balancer for incoming data fetch requests. The proxy assignor 228 can function similarly as the proxy assignor 216. In some embodiments, the proxy assignor 228 is hosted on its own computer server (e.g., a computer server that does not host other logic components of the origin cache system 202). The origin cache system 202 can implement the request processing tier 222 with the proxy servers 236. Each of the proxy servers 236 can be implemented on a physical computer server or a virtual machine. The proxy assignor 228 can assign (e.g., randomly assigned) a data fetch request to one of the proxy servers 236. Each of the proxy servers 236 processes a subset of all incoming data fetch requests received by the proxy assignor 228. For example, the data fetch requests can be formatted according to the HTTP or other TCP-based protocol.

The origin cache system 202 can service multiple edge PoP cache systems. The edge PoP cache system 204 can establish a HTTP or HTTPS connection with the assigned proxy server. A data fetch request from the edge PoP cache system 204 can specify the URL corresponding to the requested content object (e.g., the media file or the live stream). The assigned proxy server can determine whether the requested content object is available in the assigned proxy server (e.g., in a local cache of the proxy server and not part of the storage tier 218). If the assigned proxy server has the requested content object, the assigned proxy server can directly return the content object to the edge PoP cache system 204. If the assigned proxy server does not have the requested content object, the assigned proxy server can generate a cache lookup request to send to a cache server in the storage tier 218.

The origin cache system 202 can implement the storage tier 218 with the cache servers 220. The assigned proxy server can select a cache server to send the cache lookup request. For example, the assigned proxy server can select the cache server based on the URL. For example, the assigned proxy server can process the URL through a hash function to compute a hash value and utilize the hash value as a key for determining which cache server to send the cache lookup request. The selected cache server can determine whether there is a cache hit or a cache miss in its own data storage cache. If there is a cache hit, the selected cache server returns the requested content object to the assigned proxy server, and the assigned proxy server returns the requested content object to the edge PoP cache system 204 to fulfill the data fetch request. In some embodiments, if there is a cache miss, the selected cache server notifies the assigned proxy server of the cache miss, and the assigned proxy server contacts a live stream server system (e.g., the live stream server system 114) to fetch the requested content object. In some embodiments, if there is a cache miss, the selected cache server directly sends a data fetch request to the live stream server system.

Figure 3:
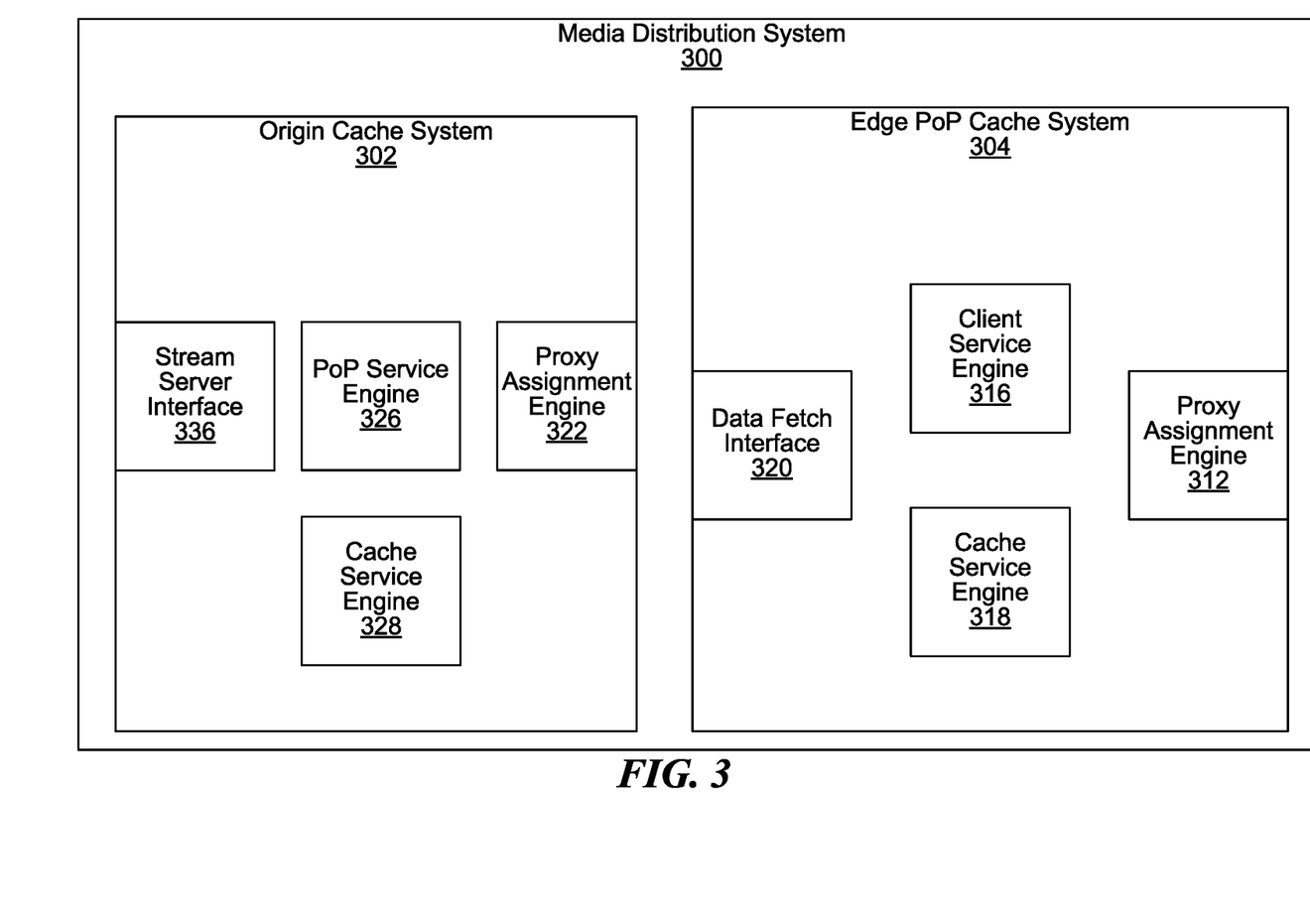
FIG. 3 is a block diagram illustrating logic components of cache systems in a media distribution system, in accordance with various embodiments.

FIG. 3 is a block diagram illustrating logic components of cache systems in a media distribution system 300 (e.g., the media distribution system 100 or the media distribution system 200), in accordance with various embodiments. Various computer servers can execute a logic component to instantiate one or more run-time instances of the logic component.

The media distribution system 300 can include a computing cluster implementing an origin cache system 302 (e.g., the origin cache system 202) and a computer cluster implementing an edge PoP cache system (e.g., the edge PoP cache system 204). For example, a computing cluster can include one or more computing devices, such as the computing device 700 of FIG. 7.

The edge PoP cache system 304 includes a proxy assignment engine 312, a client service engine 316, a cache service engine 318, and a data fetch interface 320. The proxy assignment engine 312 can be executed by a processor to instantiate the proxy assignor 228. The client service engine 316 can be executed by one or more processors to instantiate the proxy servers 214. The cache service engine 318 can be executed by one or more processors to instantiate the cache servers 210. The data fetch interface 320 can be called by the proxy servers 214 or the cache servers 210 to communicate with the origin cache system 302.

The origin cache system 302 includes a proxy assignment engine 322, a PoP service engine 326, a cache service engine 328, and a stream server interface 336. The proxy assignment engine 322 can be executed by a processor to instantiate the proxy assignor 228. The PoP service engine 326 can be executed by one or more processors to instantiate the proxy servers 226. The cache service engine 328 can be executed by one or more processors to instantiate the cache servers 220. The stream server interface 336 can be called by the proxy servers 226 or the cache servers 220 to communicate with a live stream server system (e.g., the live stream server system 114).

Functional/logic components (e.g., applications, engines, modules, and databases) associated with the media distribution system 100, the media distribution system 200, and/or the media distribution system 300 can be implemented as circuitry, firmware, software, or other functional instructions. For example, the functional/logic components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logic components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logic components may operate individually and independently of other functional/logic components. Some or all of the functional/logic components may be executed on the same host device or on separate devices. The separate devices can be coupled through one or more communication channels (e.g., wireless or wired channel) to coordinate their operations. Some or all of the functional/logic components may be combined as one component. A single functional/logic component may be divided into sub-components, each sub-component performing separate method step or method steps of the single component.

In some embodiments, at least some of the functional/logic components share access to a memory space. For example, one functional/logic component may access data accessed by or transformed by another functional/logic component. The functional/logic components may be considered "coupled" to one another if they share a physical connection or a virtual connection, directly or indirectly, allowing data accessed or modified by one functional/logic component to be accessed in another functional/logic component. In some embodiments, at least some of the functional/logic components can be upgraded or modified remotely (e.g., by reconfiguring executable instructions that implements a portion of the functional/logic components). The systems, engines, or devices described may include additional, fewer, or different functional/logic components for various applications.

Figure 4:
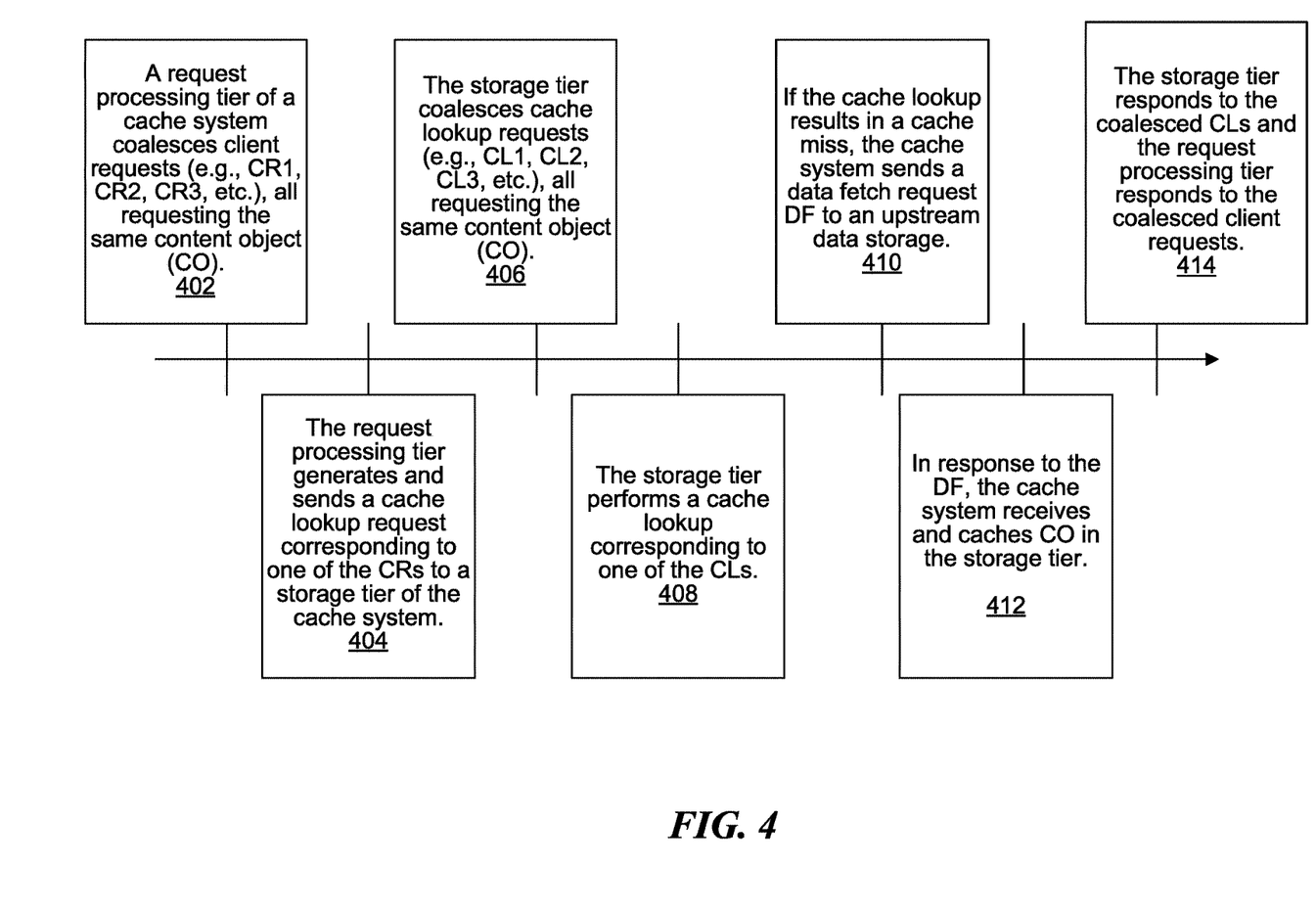
FIG. 4 is a timeline diagram illustrating a cache system coalescing and processing content requests, in accordance with various embodiments.

FIG. 4 is a timeline diagram illustrating a cache system (e.g., the origin cache system 202 or the edge PoP cache system 204) coalescing and processing content requests, in accordance with various embodiments. At block 402, a request processing tier (the request processing tier 212 or the request processing tier 222) of the cache system can coalesce client requests (e.g., "CR1", "CR2", "CR3", etc.), all requesting the same content object ("CO"). At block 404, the request processing tier can generate and send a cache lookup request corresponding to one of the CRs to a storage tier (e.g., the storage tier 206 or the storage tier 218) of the cache system. By generating only a single cache lookup request at a time, despite receiving the coalesced client requests, the request processing tier decreases the likelihood of overloading the storage tier of the cache system.

At block 406, the storage tier coalesces cache lookup requests (e.g., "CL1", "CL2", "CL3", etc.), all requesting the same content object (e.g., CO). At block 408, the storage tier performs a cache lookup corresponding to one of the CLs. By processing only a single cache lookup request at a time, despite receiving the coalesced cache lookup requests, the storage tier decreases the likelihood of overloading an upstream data storage by an overwhelming number of cache misses.

For example, at block 410, if the cache lookup results in a cache miss, the cache system sends a data fetch request ("DF") to an upstream data storage. At block 412, the cache system can receive and cache the content object in the storage tier, in response to sending the data fetch request. Because the content object is now available in the storage tier, at block 414, the storage tier can respond to the coalesced CLs and, in turn, the request processing tier can respond to the coalesced client requests.

Figure 5:
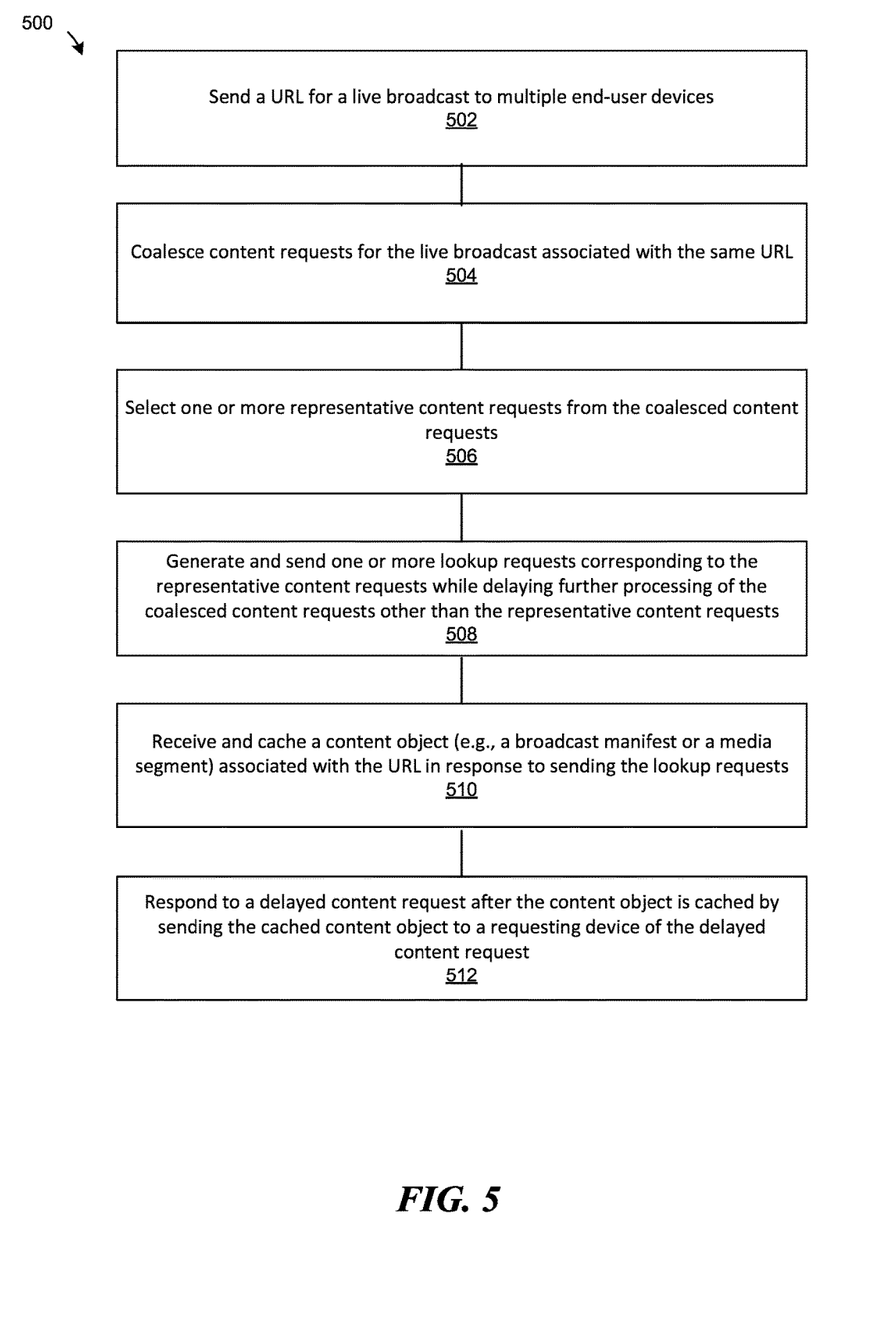
FIG. 5 is a flow diagram illustrating a method of operating a media distribution system to coalesce content requests, in accordance with various embodiments.

FIG. 5 is a flow diagram illustrating a method 500 of operating a media distribution system (e.g., the media distribution system 100, the media distribution system 200, and/or the media distribution system 300) to coalesce content requests, in accordance with various embodiments. At block 502, a client interface (e.g., the web server system 134 or the notification server system 138) of the media distribution system can send a URL for a live broadcast (e.g., a live video or audio broadcast) to multiple end-user devices. In some examples, the client interface can send notifications with the URL to user accounts in a social networking system. The notifications can suggest the user accounts to follow the URL to receive/stream the live broadcast. In some examples, the client interface can generate a news story entry to different user accounts in a social networking system. The news story entry can include the URL to the live broadcast.

At block 504, a cache system (e.g., the edge PoP cache system 106 or the origin cache system 110) of the media distribution system can coalesce content requests for the live broadcast associated with the same URL. The coalesced content requests can all specify the same URL. The content requests can be formatted according to HTTP, RTMP, transport layer security (TLS) protocol, secure sockets layer (SSL) protocol, other transmission control protocol (TCP) based application layer protocol, HLS, or any combination thereof. At block 506, the cache system can select one or more representative content requests from the coalesced content requests.

These representative content requests can be processed ahead of other content requests to prevent overloading of a data source upstream from the chain of media distribution. At block 508, the cache system can generate and send one or more lookup requests (e.g., one or more cache lookup requests or one or more data fetch requests) corresponding to the representative content requests while delaying further processing of the coalesced content requests other than the representative content requests. In some embodiments, the cache system delays the further processing of the non-selected coalesced content requests as a response to identifying that a number of the coalesced content requests exceed a pre-configured threshold. The lookup requests can be formatted according to HTTP, RTMP, TLS protocol, SSL protocol, other TCP-based application layer protocol, HLS, or any combination thereof. In some embodiments, the lookup requests are sent from a request processing tier of the cache system to a storage tier of the cache system. In some embodiments, the lookup requests are sent from the cache system to an upstream data source (e.g., a live stream server system or an origin cache system).

In some embodiments, the further processing of the coalesced content requests is delayed until the content object associated with the URL is cached in the cache system. In some embodiments, the further processing of the coalesced content requests is delayed for a preset period. In some embodiments, the further processing of the coalesced content requests is delayed according to an exponential backoff algorithm. The exponential backoff algorithm involves processing the remaining coalesced content requests after an initial delay by repeatedly attempting to fetch the requested content object until successful, where the repeated attempts are temporally spaced by exponentially increasing intervals. In some embodiments, the exponentially increasing intervals are also randomized within a preset range. For example, the cache system can first process the coalesced content requests within 10-15 milliseconds (ms) of coalescing the content requests, and if the processing times out, the cache system processes coalesced content requests after 20-25 ms. The attempts can then be repeated at 40-45 ms, 80-85 ms, etc.

In one example, the further processing of the coalesced content requests can include generating and sending a cache lookup request to the storage tier to determine an availability of a data file associated with the URL. In another example, the further processing of the coalesced content requests can include generating and sending a data fetch request to an origin cache system or a live stream server system to determine availability of a data file associated with the URL.

At block 510, the cache system can receive and cache a content object (e.g., a broadcast manifest or a media segment indicated in a broadcast manifest) associated with the URL in response to sending the lookup requests. At block 512, the cache system can respond to a delayed content request after the content object is cached by sending the cached content object to a requesting device (e.g., one of the end-user devices 102, a proxy server, and/or a cache server) of the delayed content request.

In some embodiments, the cache system is an edge PoP cache system that services multiple end-user devices. In some embodiments, the cache system is an origin cache system that services multiple edge PoP cache systems. In some embodiments, blocks 504, 506, 508, 510, and 512 are performed by a request processing tier (e.g., of the edge PoP cache system or the origin cache system) implemented by one or more proxy servers. In some embodiments, blocks 504, 506, 508, 510, and 512 are performed by a storage tier (e.g., of the edge PoP cache system or the origin cache system) implemented by one or more cache servers.

In embodiments involving the request processing tier of the edge PoP cache system, the content requests can be client requests from end-user devices. In embodiments involving the request processing tier of the origin cache system, the content requests can be the data fetch requests from one or more edge PoP systems. In these embodiments involving the request processing tier, the lookup requests can be cache lookup requests to a storage tier of the cache system.

In embodiments involving the storage tier of the edge PoP cache system or the origin cache system, the content requests can be cache lookup requests from a request processing tier of the cache system. In these embodiments involving the storage tier, the lookup requests can be data fetch requests to an external data storage system (e.g., the origin cache system or the live stream server system). In these embodiments, sending the lookup requests can be in response to determining a cache miss of a content object corresponding to the URL at the storage tier.

Figure 6:
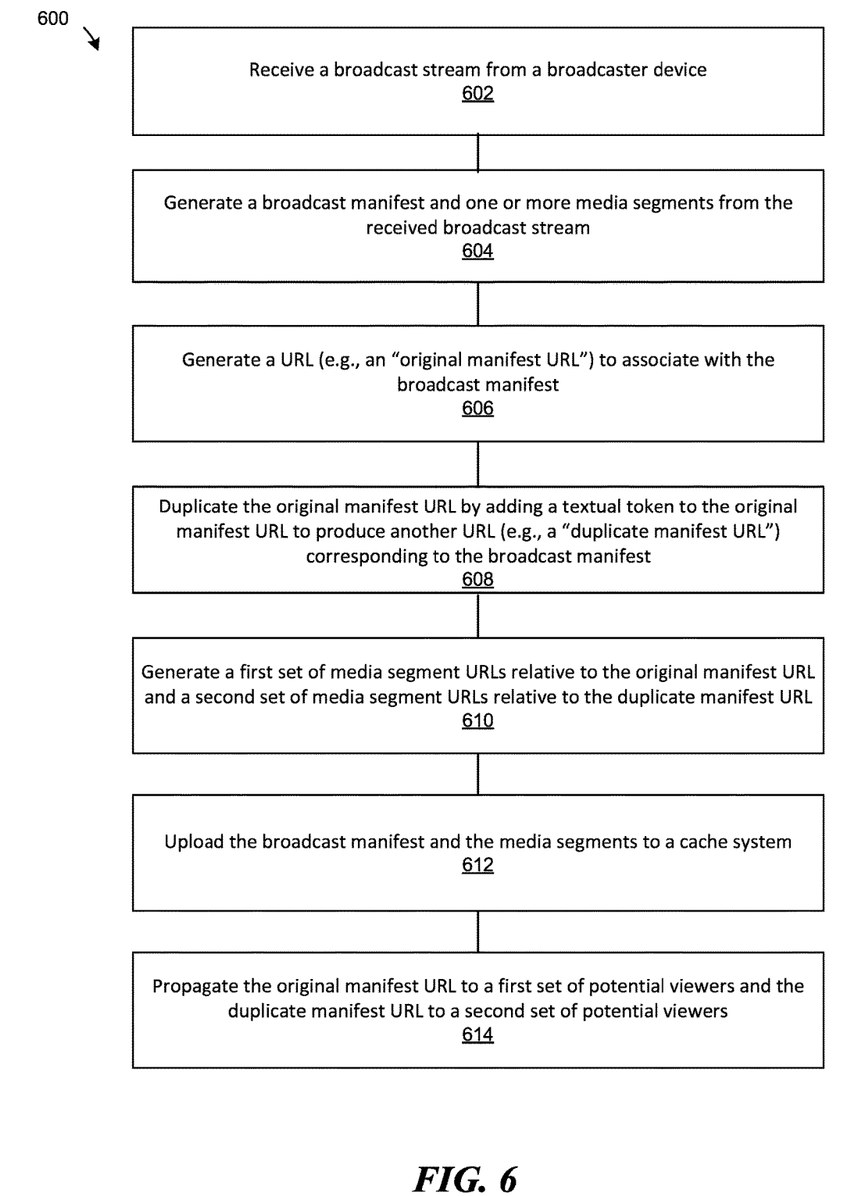
FIG. 6 is a flow diagram illustrating a method of operating a media distribution system to duplicate broadcast manifest URLs, in accordance with various embodiments

FIG. 6 is a flow diagram illustrating a method 600 of operating a media distribution system (e.g., the media distribution system 100, the media distribution system 200, or the media distribution system 300) to duplicate broadcast manifest URLs, in accordance with various embodiments. The method 600 can alleviate the load on cache servers in a storage tier of a cache system in the media distribution system. At block 602, a live stream server system (e.g., the live stream server system 114) can receive a broadcast stream from a broadcaster device (e.g., the broadcaster device 118).

At block 604, the live stream server system can generate a broadcast manifest and one or more media segments from the received broadcast stream. For example, the live stream server can divide a broadcast stream from a broadcaster device into one or more media segments (e.g., video segments). The broadcast manifest can identify the media segments via one or more segment identifiers. The live stream server system can generate the segment identifiers as sequential symbols. The number of the segment identifiers can be equal to the number of the media segments resultant from the dividing of the media segments.

At block 606, the live stream server system can further generate a URL (e.g., referred to as the "original manifest URL") to associate with the broadcast manifest. At block 608, the live stream server system can duplicate the original manifest URL by adding a textual token to the original manifest URL to produce another URL (e.g., a "duplicate manifest URL") corresponding to the broadcast manifest. In some embodiments, the live stream server system can generate multiple duplicate manifest URLs based on the original manifest URL generated at block 606. The added textual token and the original manifest URL can become part of the duplicate manifest URL. In some embodiments, the textual token is added as a prefix to the original manifest URL. In some embodiments, the textual token is added as a suffix to the original manifest URL. In some embodiments, the duplicate manifest URLs are generated individually over time to meet demand. For example, the live streams server system can monitor a number of URL sharing content in a social network system. The URL sharing content are content posted in the social networking system that identifies the original manifest URL or a duplicate thereof. The live stream server system can generate an additional duplicate manifest URL in response to detecting an increase in the number of the URL sharing content above a threshold. In some embodiments, the duplicate manifest URLs are generated in batch.

In some embodiments, at block 610, the live stream server system can generate a first set of media segment URLs relative to the original manifest URL and a second set of media segment URLs relative to the duplicate manifest URL. For example, the original manifest URL can be part of the first set of media segment URLs and the duplicate manifest URL can be part of the second set of media segment URLs. In embodiments with multiple duplicate manifest URLs, the live stream server system can generate a new set of media segment URLs relative to each duplicate manifest URL (e.g., by adding a sequential tokens, corresponding to the sequence of the media segments, to the duplicate manifest URL).

At block 612, the live stream server system can upload the broadcast manifest and the media segments to a cache system to make the broadcast manifest accessible via either the original manifest URL or the duplicate manifest URL and the media segments accessible via either the original manifest URL or the duplicate manifest URL in combination with the segment identifiers. Each of the media segments can be accessible at the cache system via a segment URL. The segment URL can combine either the original manifest URL or the duplicate manifest URL with a corresponding segment identifier.

In some embodiments, the live stream server system uploads at least two sets of copies of the broadcast manifest and the media segments, the sets respectively corresponding to the original manifest URL and the duplicate manifest URL. In some embodiments, the cache system includes at least an origin cache tier (e.g., the origin cache system 110) and a second cache tier (e.g., the edge PoP cache system 106). In some embodiments, the origin cache tier stores a single copy of the broadcast manifest keyed to (e.g., and thus accessible via) both the original manifest URL and the duplicate manifest URL. For each unique URL of a content object requested from the origin cache tier, the second cache tier can store a copy of the content object. The duplication of the URLs can thus create different copies in the second cache tier and different cache request paths that can load-balance the cache system during a live broadcast.

At block 614, the live stream server system can propagate the original manifest URL to a first set of potential viewers (e.g., specific sets of viewer accounts and/or viewer devices) and the duplicate manifest URL to a second set of potential viewers (e.g., specific sets of viewer accounts and/or viewer devices). For example, the media distribution system can limit a threshold number of potential viewers for each manifest URL (e.g., original or duplicate). In one example, the live stream server system can divide target user accounts into a number of user groups equal to the number of the duplicate manifest URLs. The live stream server system can then propagate the plurality of duplicate manifest URLs respectively to the user groups.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 7:
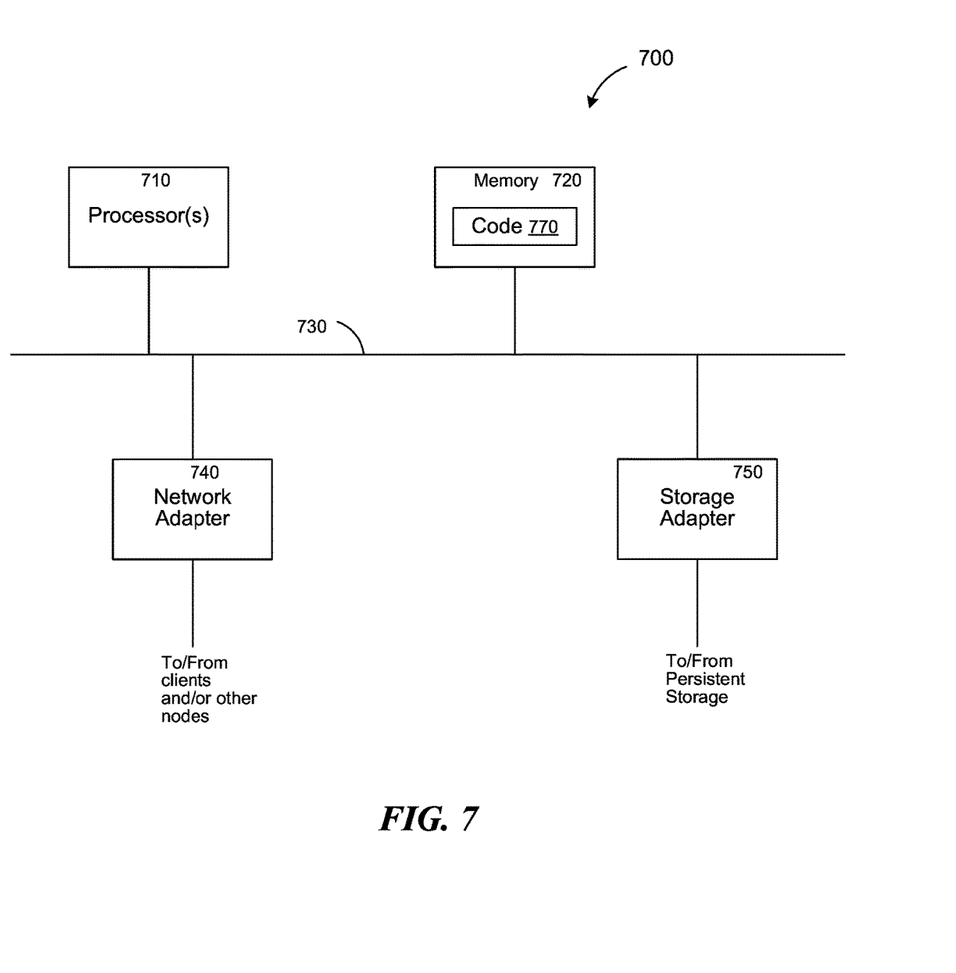
FIG. 7 is a block diagram illustrating an example of a computing device in a media distribution system, in accordance with various embodiments.

FIG. 7 is a block diagram illustrating an example of a computing device 700 in a media distribution system (e.g., the media distribution system 100, the media distribution system 200, and/or the media distribution system 300), in accordance with various embodiments. For example, the computing device 700 can represent one or more computing devices in the media distribution system 100, the media distribution system 200, and/or the media distribution system 300, and/or methods and processes described in this disclosure. The computing device 700 includes one or more processors 710 and memory 720 coupled to an interconnect 730. The interconnect 730 is an abstraction that represents any one or more separate physical buses, point-to-point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 710 is/are the central processing unit (CPU) of the computing device 700 and thus controls the overall operation of the computing device 700. In certain embodiments, the processor(s) 710 accomplishes this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the computing device 700. The memory 720 represents any form of random access memory (RAM), read-only memory (ROM), flash memory, or the like, or a combination of such devices. In use, the memory 720 may contain a code 770 containing instructions according to the systems or methods disclosed herein.

Also connected to the processor(s) 710 through the interconnect 730 are a network adapter 740 and a storage adapter 750. The network adapter 740 provides the computing device 700 with the ability to communicate with remote devices (e.g., amongst devices, components, and/or systems described in FIGS. 1-6), over a network and may be, for example, an Ethernet adapter or Fibre Channel adapter. The network adapter 740 may also provide the computing device 700 with the ability to communicate with other computers. The storage adapter 750 enables the computing device 700 to access a persistent storage, and may be, for example, a Fibre Channel adapter or SCSI adapter. In some embodiments, the persistent storage and/or the memory 720 may be used to implement a data cache as described in this disclosure.

The code 770 stored in memory 720 may be implemented as software and/or firmware to program the processor(s) 710 to carry out actions described above. In certain embodiments, such software or firmware may be initially provided to the computing device 700 by downloading it from a remote system through the computing device 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "several embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A computer-implemented method, comprising:
    dividing a broadcast stream from a broadcaster device into one or more media segments;
    generating an original manifest uniform resource locator (URL) and a plurality of duplicate manifest URLs, wherein the original manifest URL and each of the plurality of duplicate manifest URL are different text strings;
    generating a broadcast manifest that identifies the media segments via one or more segment identifiers;
    uploading the broadcast manifest and the media segments to a cache system to make the broadcast manifest accessible via either the original manifest URL or the duplicate manifest URL and the media segments accessible via either the original manifest URL or the duplicate manifest URL in combination with the segment identifiers; and
    propagating the original URL to a first set of potential viewer devices and the duplicate manifest URL to a second set of potential viewer devices, wherein said propagating includes dividing target user accounts into a number of user groups equal to the number of the plurality of duplicate manifest URLs and propagating the plurality of duplicate manifest URLs respectively to the user groups.

2. The computer-implemented method of claim 1, wherein said generating the broadcast manifest includes generating the segment identifiers as sequential symbols; and wherein the number of the segment identifiers is equal to the number of the media segments resultant from said dividing.

3. The computer-implemented method of claim 1, wherein said uploading includes uploading at least two sets of copies of the broadcast manifest and the media segments, the sets respectively corresponding to the original manifest URL and the duplicate manifest URL.

4. The computer-implemented method of claim 1, wherein the cache system includes at least an origin cache tier and a second cache tier; wherein the origin cache tier stores a single copy of the broadcast manifest keyed to both the original manifest URL and the duplicate manifest URL; and wherein for each unique URL of a content object requested from the origin cache tier, the second cache tier stores a copy of the content object.

5. The computer-implemented method of claim 1, wherein each of the media segments is accessible at the cache system via a segment URL; and wherein the segment URL combines the original manifest URL or the duplicate manifest URL with a corresponding segment identifier.

6. The computer-implemented method of claim 1, wherein generating the duplicate manifest URL is by adding a textual token to the original manifest URL.

7. The computer-implemented method of claim 1, wherein said propagating includes providing the original manifest URL and the duplicate manifest URL to a web server system of a social networking system.

8. The computer-implemented method of claim 1, wherein said propagating includes providing the original manifest URL and the duplicate manifest URL to a push notification system of a social networking system.

9. The computer-implemented method of claim 1, further comprising:
    monitoring a number of URL sharing content in a social network system, wherein the URL sharing content identifies the original manifest URL or a duplicate thereof; and generating an additional duplicate manifest URL in response to detecting an increase in the number of the URL sharing content above a threshold.

10. The computer-implemented method of claim 1, further comprising:
coalescing cache lookup requests for the broadcast stream associated with a media segment URL that includes the duplicate manifest URL;
selecting one or more representative cache lookup requests from the coalesced cache lookup requests;
sending one or more data fetch requests corresponding to the representative cache lookup requests to an origin cache tier of the cache system while delaying further processing of the coalesced cache lookup requests other than the representative cache lookup requests;
caching a content object associated with the media segment URL in response to sending the data fetch requests; and
responding to a delayed cache lookup request after the content object is cached.

11. A computer-implemented method, comprising:
dividing a broadcast stream from a broadcaster device into one or more media segments;
generating an original manifest uniform resource locator (URL) and a duplicate manifest URL, wherein the original manifest URL and the duplicate manifest URL are different text strings;
generating a broadcast manifest that identifies the media segments via one or more segment identifiers;
uploading the broadcast manifest and the media segments to a cache system to make the broadcast manifest accessible via either the original manifest URL or the duplicate manifest URL and the media segments accessible via either the original manifest URL or the duplicate manifest URL in combination with the segment identifiers;
coalescing cache lookup requests for the broadcast stream associated with a media segment URL that includes the duplicate manifest URL;
selecting one or more representative cache lookup requests from the coalesced cache lookup requests;
sending one or more data fetch requests corresponding to the representative cache lookup requests to an origin cache tier of the cache system while delaying further processing of the coalesced cache lookup requests other than the representative cache lookup requests;
caching a content object associated with the media segment URL in response to sending the data fetch requests; and
responding to a delayed cache lookup request after the content object is cached.

12. The computer-implemented method of claim 11, wherein said generating the broadcast manifest includes generating the segment identifiers as sequential symbols; and wherein the number of the segment identifiers is equal to the number of the media segments resultant from said dividing.

13. The computer-implemented method of claim 11, wherein said uploading includes uploading at least two sets of copies of the broadcast manifest and the media segments, the sets respectively corresponding to the original manifest URL and the duplicate manifest URL.

14. The computer-implemented method of claim 11, wherein the cache system includes at least an origin cache tier and a second cache tier; wherein the origin cache tier stores a single copy of the broadcast manifest keyed to both the original manifest URL and the duplicate manifest URL; and wherein for each unique URL of a content object requested from the origin cache tier, the second cache tier stores a copy of the content object.

15. The computer-implemented method of claim 11, wherein each of the media segments is accessible at the cache system via a segment URL; and wherein the segment URL combines the original manifest URL or the duplicate manifest URL with a corresponding segment identifier.

16. The computer-implemented method of claim 11, wherein generating the duplicate manifest URL is by adding a textual token to the original manifest URL.

17. The computer-implemented method of claim 11, further comprising propagating the original manifest URL to a first set of potential viewer devices and the duplicate manifest URL to a second set of potential viewer devices.

18. The computer-implemented method of claim 11, wherein said propagating includes providing the original manifest URL and the duplicate manifest URL to a web server system of a social networking system.

19. The computer-implemented method of claim 11, wherein said propagating includes providing the original manifest URL and the duplicate manifest URL to a push notification system of a social networking system.

20. The computer-implemented method of claim 11, wherein said generating the duplicate manifest URL includes generating a plurality of duplicate manifest URLs.

* * * * *

UNITED STATES PATENT AND TRADEMARK OFFICE
CERTIFICATE OF CORRECTION

PATENT NO. : 10,476,688 B1
APPLICATION NO. : 16/162454
DATED : November 12, 2019
INVENTOR(S) : Federico Daniel Larumbe et al.

It is certified that error appears in the above-identified patent and that said Letters Patent is hereby corrected as shown below:

On the Title Page

Column 2, item (56), U.S. Patent Documents, Line 11, delete "Kluysegems" and insert -- Huysegems --, therefor.

Signed and Sealed this
Twenty-first Day of January, 2020

Andrei Iancu
*Director of the United States Patent and Trademark Office*